F. SCHAEFER.
BRAKE LEVER.
APPLICATION FILED MAY 1, 1920.
1,368,759.
Patented Feb. 15, 1921.
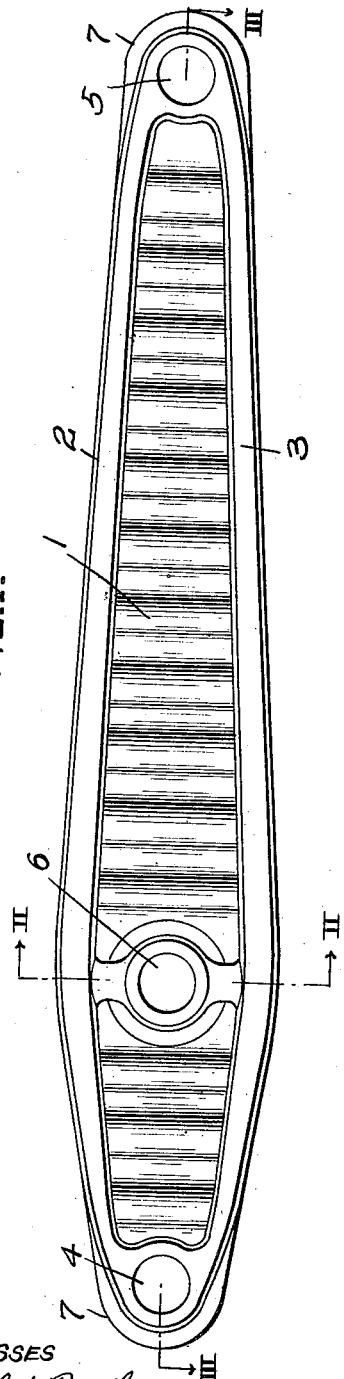
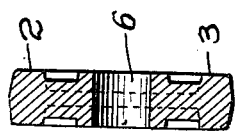
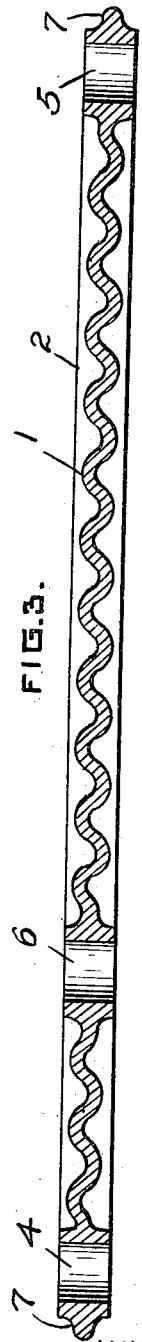
WITNESSES
J. Herbert Bradley
INVENTOR
Frederic Schaefer.
by Winter & Brown,
his attorneys

UNITED STATES PATENT OFFICE.

FREDERIC SCHAEFER, OF PITTSBURGH, PENNSYLVANIA.

BRAKE-LEVER.

1,368,759. Specification of Letters Patent. Patented Feb. 15, 1921.

Application filed May 1, 1920. Serial No. 378,311.

*To all whom it may concern:*

Be it known that I, FREDERIC SCHAEFER, a resident of Pittsburgh, in the county of Allegheny and State of Pennsylvania, have invented a new and useful Improvement in Brake-Levers, of which the following is a specification.

The invention relates to brake levers such as are used in the brake gears of railway passenger coaches, freight cars, and like vehicles, and the object thereof is to provide a brake lever which will possess maximum resistance to buckling in proportion to the thickness of its web and the weight of metal forming the web.

A further object of the invention is to provide the ends of brake levers with a reinforcement which will add materially to the strength of the lever without appreciably increasing its weight.

The invention is illustrated in the accompanying drawings, which form part of this specification, and of which Figure 1 is a face view of a brake lever, and Figs. 2 and 3 transverse sectional views respectively, taken on the lines II—II and III—III, Fig. 1.

Brake levers such as contemplated herein include a web 1 and flanges 2 and 3 formed integrally with the web at its outer edges, the lever being provided with end eyes 4 and 5 and with an intermediate eye 6 for attachment to a brake gear in the well known manner. As far as the present invention is concerned, the flanges and eyes may be of various forms of construction.

One feature of the invention has to do with the form of the brake lever web. That the web may have maximum strength in proportion to the amount or weight of material used in it, it is of corrugated form. While the corrugations may be of various shapes to the end that the brake lever will better resist buckling, it is preferably provided with reverse cylindrical flutes in the manner particularly illustrated in Fig. 3. The corrugations extend transversely of the longitudinal axis of the brake lever to resist the normal shear strains placed upon the web of the lever.

A further feature of the invention has to do with the provision of structural reinforcements for the end eyes of the lever. As shown in the drawings, there is provided at each end of the brake lever a centrally disposed outwardly projecting rib 7 of substantially less width than the portion of the brake lever adjacent to the end eyes. By providing such ribs, the bending resistance, as well as the shearing resistance, of the metal on the outside of the eyes are very substantially increased without the addition of unnecessary material and consequent increase in weight of the brake lever.

While the brake lever may be variously manufactured it is preferably drop-forged in the well known or in any desired manner, the formation of the lever by the drop-forging process being preferred because of the greater assurance of structural soundness with a minimum amount of material.

According to the provisions of the patent statutes, I have described the principle and operation of my invention, together with the structure which I now consider to represent the best embodiment thereof. However, I desire to have it understood that, within the scope of the appended claims, my invention may be practised by other forms of construction than that specifically shown and described.

I claim:—

1. A brake lever having a web and flanges formed integrally with and at the edges of said web and having end eyes and an intermediate eye, said web being corrugated to resist buckling.

2. A brake lever having a web and flanges formed integrally with and at the edges of said web and having end eyes and an intermediate eye, said web being corrugated in the form of reverse cylindrical flutes to resist buckling.

3. A drop-forged brake lever having a web and flanges formed integrally with and at the edges of said web and having end eyes and an intermediate eye, said web being corrugated in the form of reverse cylindrical flutes to resist buckling and each end of the brake lever having a centrally-disposed outwardly-projecting reinforcing rib.

In testimony whereof, I have hereunto set my hand.

FREDERIC SCHAEFER.

Witnesses:
T. G. TRILL,
PAUL N. CRITCHLOW.